UNITED STATES PATENT OFFICE.

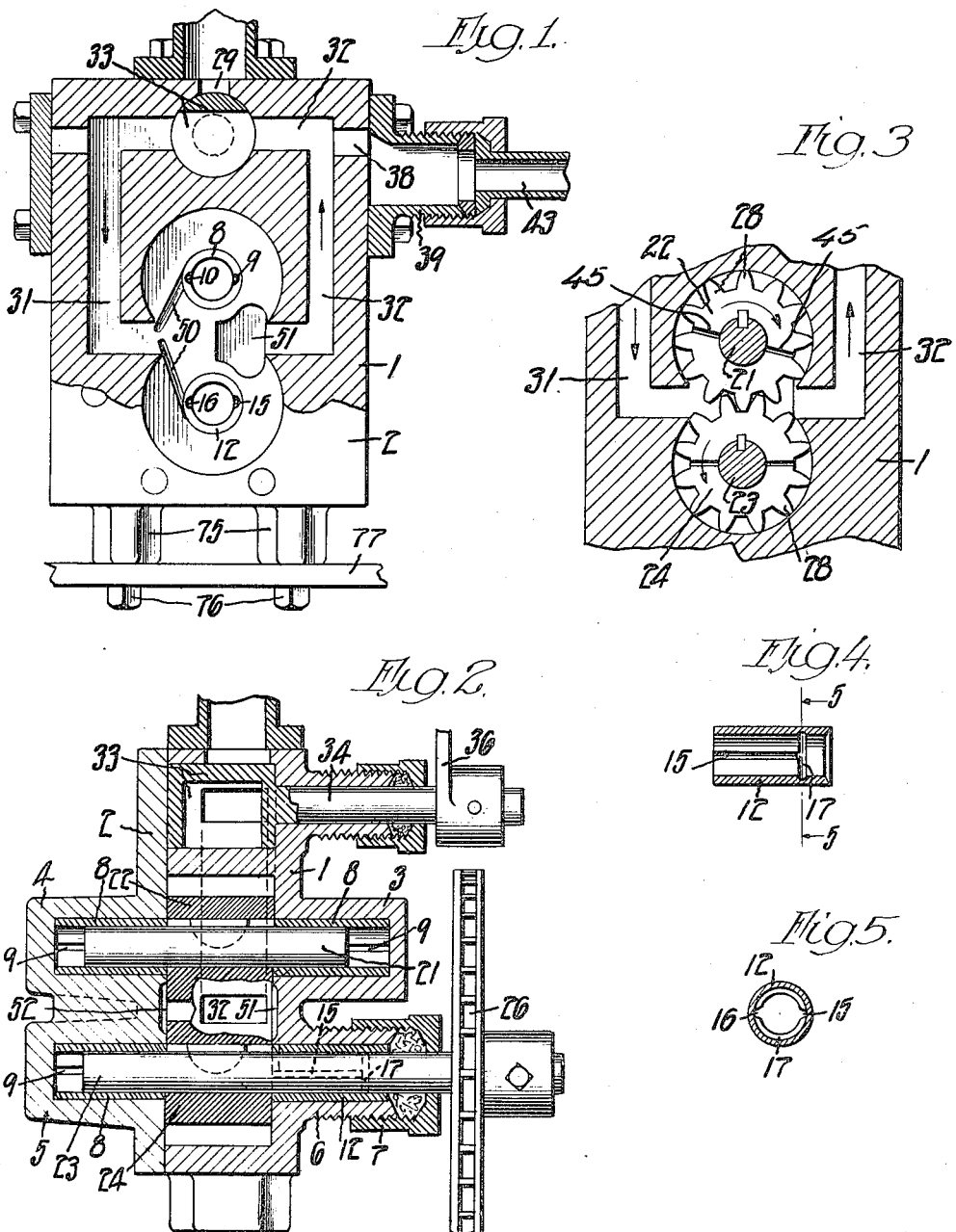

GARFIELD A. WOOD, OF DETROIT, MICHIGAN.

GEAR-PUMP.

1,271,970. Specification of Letters Patent. Patented July 9, 1918.

Original application filed March 15, 1915, Serial No. 14,479. Divided and this application filed August 28, 1916. Serial No. 117,235.

*To all whom it may concern:*

Be it known that I, GARFIELD A. WOOD, a citizen of the United States, and residing at Detroit, in the county of Wayne and State of Michigan, have invented a new and Improved Gear-Pump, of which the following is a specification.

This application is a division of my prior application filed March 15, 1915, Serial Number 14,479.

In the use of gear oil pumps, much difficulty is experienced due to the fact that the pressure of the liquid becomes equalized on all parts of the gear shaft bearings, thus preventing circulation and causing them to run dry; and, in high pressure installations, leakage is very apt to occur at any point where one of the shafts passes through the pump casing. One object of the present invention is to provide a passage or passages leading from the suction side of the pump to the vicinity of the outer ends of the bearings, whereby a constant circulation of liquid through the bearings is insured, and whereby, in those instances in which the shaft passes through the casing, leakage is prevented.

The nature of the invention will more fully appear from the description and appended drawings, wherein two embodiments are shown.

In the drawings, Figure 1 is a side view of one embodiment of my invention, parts being broken away and the gears and gear shafts being removed. Fig. 2 is a central transverse section corresponding to Fig. 1. Fig. 3 is a fragmentary section similar to Fig. 1 showing the gears in position. Fig. 4 is a longitudinal section through a bushing for the bearing in which the projecting end of the driving shaft is supported. Fig. 5 is a section on the line 5—5 of Fig. 4.

In the embodiment of my invention shown, the body 1 of the pump casing and the cover 2 are provided with the alined bearing boxes 3 and 4 for the driven pump gear, and with the alined bearing boxes 5 and 6 for the driving gear, the three first mentioned boxes being closed at their outer ends, and the box 6 being threaded to receive the stuffing box 7 of ordinary construction. The boxes 3, 4 and 5 are lined with the bushings 8, each of which has a longitudinal oil admission groove 9 formed in its inner surface and a similar oil exit passage 10 on the side opposite the inlet groove; and the box 6 is lined with a bushing 12 having an oil inlet groove 15 and an exit groove 16 that may be diametrically related to each other. The last mentioned grooves preferably terminate slightly inwardly from the outer edge of the bushing and are joined by the circumferential groove 17. The inlet passages 9 and 15 may be omitted in certain instances as in high pressure pumps the leakage through the bearing is sufficient to accomplish the purpose.

Mounted in the oppositely located bushings 8 is a shaft 21 upon which is keyed the driven gear 22 of the pump; and the third bushing 8, together with the bushing 12, supports the driving shaft 23 to which the driving pump gear 24 is keyed. The shaft 23 extends outwardly through the stuffing box 7 and receives its torque from a sprocket wheel 26, or other preferred element. It will be seen that the shafts 21 and 23 terminate some distance from the outer walls of the bearing boxes 3, 4 and 5; the spaces between the ends of the shafts and the walls of the boxes therefore constitute passages for oil from the admission to the exit grooves.

Each of the pump gears includes the usual gear teeth 28 and is of a length to fit closely between the body 1 and cover 2 of the pump casing, and, in operation, turns in the direction indicated by the arrows in Fig. 3. The body of the casing is provided with the intake passage 29, and from which branch the feed passage 31 and the discharge passage 32 that lead, respectively, to the suction and pressure sides of the gears; and at the intersection of the three passages a three-way valve 33 is interposed, the valve shaft 34 of which passes through the stuffing box and has secured thereto the operating lever 36. The discharge passage 32 also leads through an opening 38 to a nipple 39, from which the liquid may be conducted by a pipe 43.

It will be observed (Fig. 3) that the end faces of the gears 22 and 24 are traversed by narrow grooves 45. The faces being otherwise in close engagement with the walls of the casing, it follows that the high pressure on the discharge side of the gears is transmitted to the passages 9—15 primarily only when the grooves pass across the entrance to said passages, and that the suction on the intake side is principally effective on the passages 10—16 likewise only when the grooves register therewith. This construction insures a proper feeding of the oil to the bearings without an objectionable leakage.

In order to connect the grooves 10 and 16 to the suction passage 31, the body 1 is grooved as indicated at 50 (Fig. 1), and the cover 2 is provided with similar grooves (not shown); and the body and cover are milled out or grooved at 51 and 52 respectively, to allow the escape of liquid from the end of the gears as the teeth 28 engage with each other, whereby locking of the gears is avoided.

By properly manipulating the valve 33 the liquid may be (1st) drawn in through passage 29 and delivered through pipe 43, or (2nd) allowed to by-pass the gears in the reverse direction, that is, from pipe 43 to passage 29 through passage 32, or (3rd) allowed to continually circulate in the passages 31—32 as shown.

The pump may have lugs 75 for the reception of bolts 76, whereby it may be attached to any desired support 77.

It is clear that many changes may be made in the details of construction without departing from the spirit of my invention, I do not, therefore, wish to be limited otherwise than as indicated by the subjoined claims.

I claim:—

1. A gear pump comprising in combination, a pump casing, a pair of meshing pump gears within the casing, said casing having formed therein suction and delivery passages for liquid pumped by the gears, a pair of shafts for the gears mounted in bearing relation to the casing, and means entirely within the casing for forming communication between a portion of the suction passage and a point in one of the bearings removed from the corresponding gear, said means including a groove formed in the end face of the gear whereby liquid passing from the delivery passage into the bearing may be withdrawn to insure proper circulation.

2. A gear pump comprising in combination, a pump casing, a pair of meshing pump gears within the casing, said casing having formed therein suction and delivery passages for liquid pumped by the gears, a pair of shafts for the gears mounted in bearing relation to the casing, means for forming communication between one of the first named passages and a point in one of the bearings removed from the corresponding gear, said means including a groove formed in the corresponding end face of said gear.

3. A gear pump comprising in combination, a pump casing, a pair of meshing pump gears within the casing, said casing having formed therein suction and delivery passages for liquid pumped by the gears, a pair of shafts for the gears mounted in bearing relation to the casing, one of the bearings for the gears having longitudinal grooves therein, one corresponding to the suction passage for the gears and one to the discharge passage, the end face of the corresponding gear being grooved to simultaneously register with said longitudinal grooves, whereby liquid is momentarily circulated through said bearing at each revolution of the gear.

4. A gear pump comprising a casing, a pair of meshing pump gears within the casing, said casing having formed therein suction and delivery passages for liquid pumped by the gears, a pair of shafts for the gears, a bushing interposed between one end of one of the shafts and the casing, said bushing having two longitudinal grooves in its inner surface and also having a circumferential groove in its inner surface in communication with the longitudinal grooves, one of the longitudinal grooves communicating with the suction passage and the other with the delivery passage.

5. A gear pump comprising a casing, a pair of meshing pump gears within the casing, said casing having formed therein suction and delivery passages for liquid pumped by the gears, a pair of shafts for the gears, a bushing interposed between one end of one of the shafts and the casing, said bushing having two longitudinal grooves in its inner surface, one of the longitudinal grooves communicating with the suction passage and the other with the delivery passage, and means whereby liquid is intermittently fed to one of the grooves from the delivery passage and is drawn back through the other groove to the suction passage.

GARFIELD A. WOOD.